No. 647,302. Patented Apr. 10, 1900.
J. HOON.
KITCHEN CABINET.
(Application filed Dec. 9, 1899.)
(No Model.) 2 Sheets—Sheet 1.
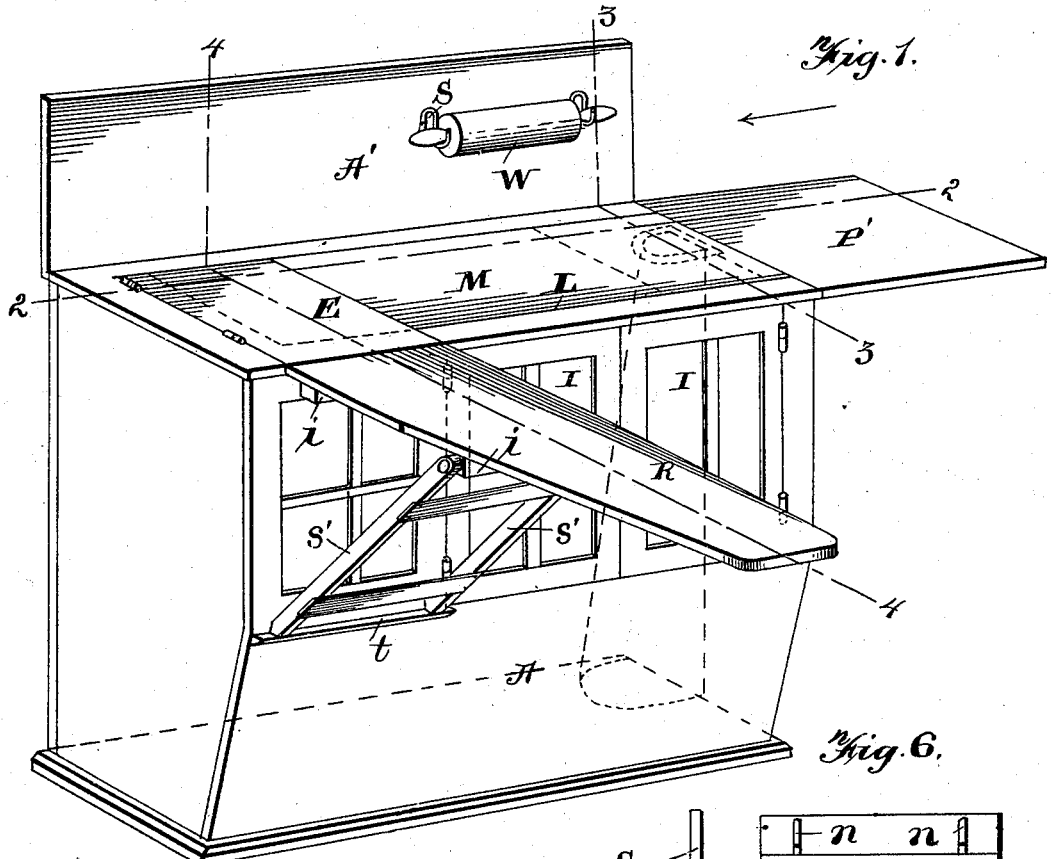
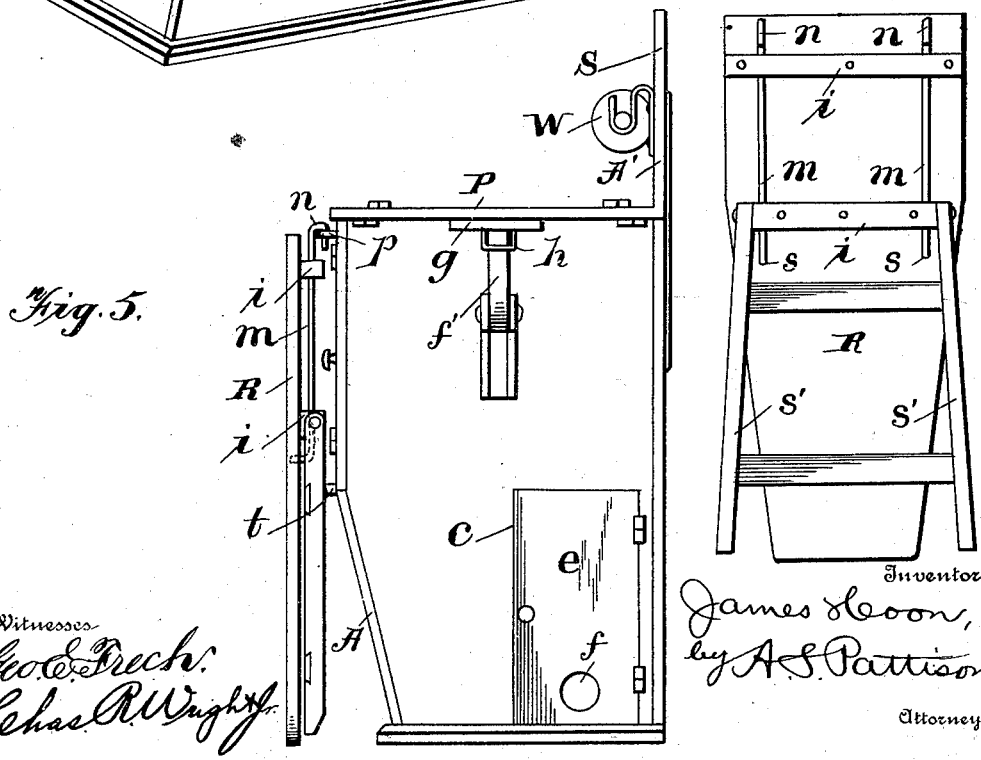
Witnesses
Geo. E. Frech.
Chas. R. Wright
Inventor
James Hoon,
by A. S. Pattison,
Attorney

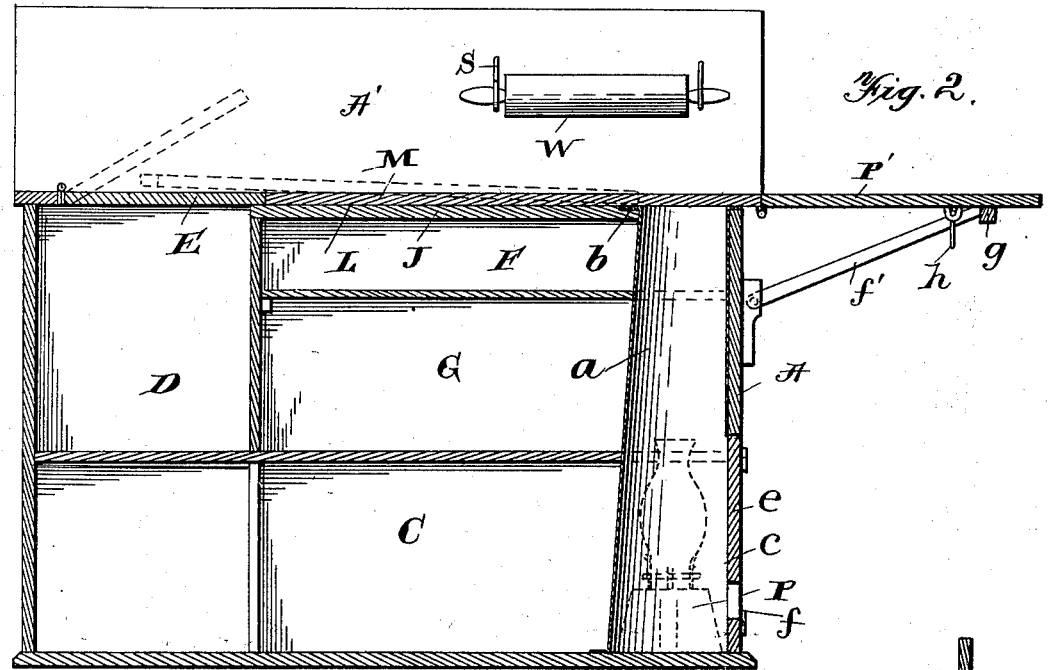
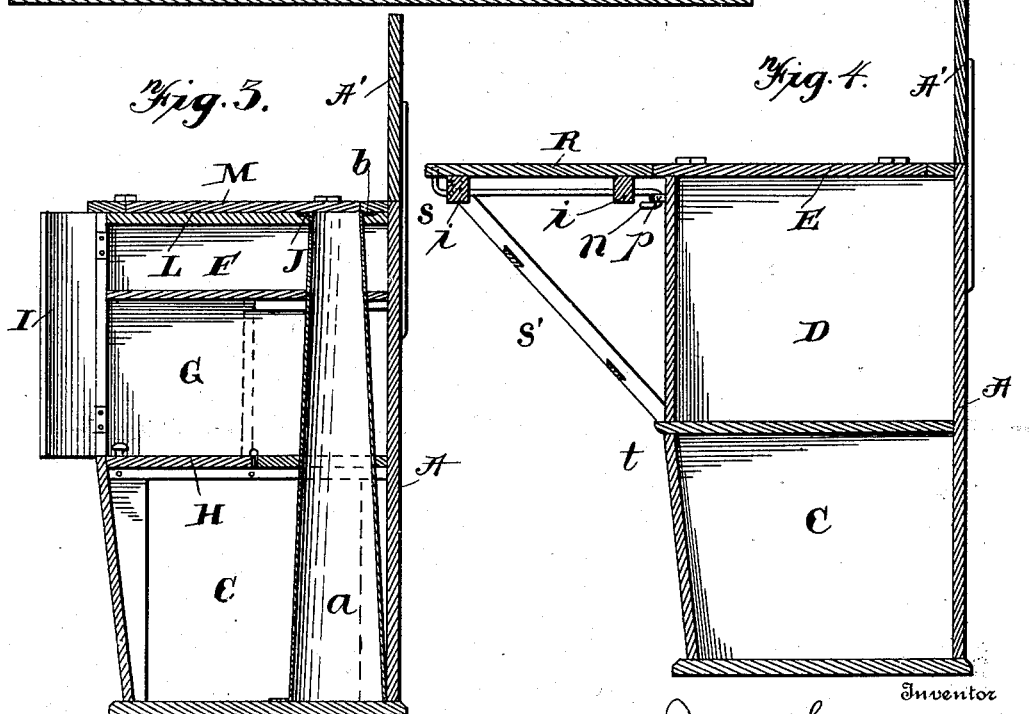

UNITED STATES PATENT OFFICE.

JAMES HOON, OF FORAKER, OHIO.

KITCHEN-CABINET.

SPECIFICATION forming part of Letters Patent No. 647,302, dated April 10, 1900.

Application filed December 9, 1899. Serial No. 739,804. (No model.)

*To all whom it may concern:*

Be it known that I, JAMES HOON, a citizen of the United States, residing at Foraker, in the county of Hardin and State of Ohio, have invented new and useful Improvements in Kitchen-Cabinets, of which the following is a specification.

My invention relates to improvements in kitchen-cabinets, and pertains to a cabinet constructed to receive the materials necessary in a kitchen for cooking and at the same time constructed to constitute a dough-raising cabinet, and also being adapted for other uses in the kitchen, all of which will be fully described hereinafter, and particularly pointed out in the claims.

In the accompanying drawings, Figure 1 is a perspective view of a cabinet embodying my invention. Fig. 2 is a vertical sectional view taken longitudinal the cabinet on the line 2 2 of Fig. 1. Fig. 3 is a vertical transverse sectional view taken on the line 3 3 of Fig. 1. Fig. 4 is a vertical transverse section taken on the line 4 4 of Fig. 1. Fig. 5 is an end view looking in the direction indicated by arrow in Fig. 1.

Referring now to the drawings, A is a case which is preferably rectangular, as here shown, and projecting upward from the rear edge of the base is a back piece A'. The lower portion of this case consists of a horizontal chamber C, which extends throughout the entire length of the case, and which chamber is intended to receive canned and preserved fruit. The top of this chamber C consists of the bottom of a flour-chamber D, which has its top provided with a swinging door E for the purpose of permitting access to the said chamber for filling it with flour and for removing the flour or meal therefrom. The case above the chamber B at the side of the flour-chamber D is divided into two compartments—an upper compartment F and a lower compartment G. The lower compartment G has its bottom provided with an upwardly-opening door H, which permits access to the chamber B for placing therein or removing therefrom the canned and preserved fruit. Access is had to the compartments F and G through the doors I, which open outward and serve to form the front of the said compartments. These compartments F and G are intended to be used for pie and bread compartments, thus providing one side of the upper portion of the case with a bread and pie cupboard and the outer side of the upper portion of the case with a flour bin or chamber. The top or ceiling J of the upper compartment F is in a plane below the upper face of the case, thus forming a recess or depression L for the reception of a kneading-board M, the said kneading-board being movable in and out of the said recess and endwise in respect thereto, for a purpose to be presently described.

Considerable trouble is experienced in the country to prevent the freezing of preserved and canned fruit, and for the purpose of adapting my cabinet to meet this need I provide an improved heating arrangement which I will now explain. This heating arrangement consists of a semicircular tube $a$, which preferably gradually enlarges downward, the lower end of this tube being in engagement with the bottom of the chamber B and its upper end extending through the top J and turned outward, as illustrated at $b$. The end of the case forms an outer wall for the semicircular tube, and the said end wall is provided with a vertical lamp-receiving opening $c$, establishing communication through the said end of the case directly within the lower end of the tube $a$. This vertical opening is closed by means of a door $e$, the said door having at its lower end an air passage or opening $f$ to supply air for the combustion of the lamp P, which is placed within the semicircular tube. This vertical opening is of a height adapted to permit the placing of the lamp sidewise therethrough within the lower end of the tube. By this arrangement direct access is permitted within the lower end of the tube from the outer side of the case for placing the lamp therein and removing it therefrom. This semicircular tube passes through the chamber B and the compartments F and G and serves to furnish sufficient heat to prevent the freezing of any articles placed within the cabinet. It will be noted that the upper end of the heating-tube passes through the top J directly under the kneading-board M, and when the lamp is in position and is lighted it is necessary to slide the kneading-board to one side, as indicated by dotted lines, Fig. 2. When the lamp is not in use—for instance, in the daytime, when the room has become heated from the stove therein—the lamp is not of course lighted, and it is then desirable to cover up the upper end of the heating-tube to prevent the falling therein of any cooking material being used about the cabinet and also for the purpose of hiding the unsightly opening otherwise exhibited. Owing to the fact that the lamp contains a chimney and that there is a considerable air-space between the chimney and the metal semicircular flue there is no danger of fire, as no part of the heated portion of the lamp comes in contact with the said heating or air tube $a$.

For the purpose of providing additional space for the upper side or top of the cabinet I provide at one end thereof a swinging shelf $P'$, the said shelf being hinged to one end of the cabinet, as shown, and this shelf is held in position by means of a brace $f$, which is suitably hinged to the outer side of the end of the case, the upper end of the brace adapted to engage a cleat or shoulder $g$ upon the under side of the said shelf, and the outer end of the brace is raised with the said shelf through the medium of a hinged hoop $h$, connected to the under side of the shelf and embracing the free end of the brace.

For the purpose of providing an ironing-board for the use of the user, thus making the cabinet much more convenient, I provide the board R, which is of the usual form, and this board is adapted to be hooked to and unhooked from the cabinet when desired. Particular attention is called to the construction of this board. The under side of the board is provided at its inner end with two transverse bars $i$, and passing through these bars in a direction longitudinal or parallel the under side of the board R are two rods $m$, the outer ends of the rods hooked, as shown at $n$, and adapted to be placed in the eyes $p$, projecting from the front side of the cabinet, as shown. The inner ends of these rods $m$ are turned inward at an angle, as shown at $s$, and enter the under side of the board R. Pivotally connected to the ends of the inner transverse bar $i$ are the swinging legs or braces $s'$, which are adapted to have their lower ends rest upon a bead, ledge, or shoulder $t$ projecting from the face of the cabinet. Owing to the specific construction of the rods $m$ a very strong arrangement is provided and one which will prevent the drawing or pulling out of the rods $m$. These rods $m$, as will be readily understood, are subjected to considerable endwise strain in the use of the board, and hence the necessity for having them so attached to the board as to prevent their being detached therefrom under the strain consequent to the use of the board.

The inner side of the back of the cabinet is provided with hooks S, which are adapted to support a rolling-pin W in a convenient location for the user, whereby the pin can be readily taken from its support or placed thereon when not being used.

Having thus described my invention, what I claim, and desire to secure by Letters Patent, is—

1. A cabinet comprising a case having a compartment or compartments, a heating or air flue extending through the said compartments the upper end of the tube or flue passing through the top of the case, and a removable kneading-board adapted to cover the upper end of the tube or flue, substantially as described.

2. A kitchen-cabinet comprising a case having a compartment or compartments, a vertically-arranged semicircular flue or tube, passing through the case and situated adjacent one wall thereof, the lower end of the flat side of the semicircular tube having an opening, the adjacent wall of the case having an opening registering with the flue-opening, and a door for the said opening, substantially as described.

3. A cabinet comprising a horizontal chamber at its bottom extending from end to end, a vertical chamber above one end of the horizontal chamber and its hinged top forming a part of the top of the cabinet, two horizontal compartments above the other end of said compartment, the top of the upper compartment being situated below the level of the top of the vertical compartment, a vertically-arranged semicircular flue having access thereto from the outside and extending from the bottom of the cabinet out through the top of the upper compartment, and a kneading-board removably fitting within the recess whereby the top of the flue is closed and the top of the cabinet made perfectly level, substantially as described.

In testimony whereof I have hereunto set my hand in the presence of two subscribing witnesses.

JAMES HOON.

Witnesses:
LEWIS $\times$ SCHMELZER,
  his
  mark
M. R. QUINT.